(12) United States Patent
Lee et al.

(10) Patent No.: US 12,026,231 B2
(45) Date of Patent: Jul. 2, 2024

(54) SYSTEM FOR LOCAL OPTIMIZATION OF OBJECT DETECTOR BASED ON DEEP NEURAL NETWORK AND METHOD OF CREATING LOCAL DATABASE THEREFOR

(71) Applicant: ELECTRONICS AND TELECOMMUNICATIONS RESEARCH INSTITUTE, Daejeon (KR)

(72) Inventors: Joon Goo Lee, Daegu (KR); Jang Woon Baek, Daegu (KR); Kil Taek Lim, Daegu (KR); Yun Won Choi, Daegu (KR); Byung Gil Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 356 days.

(21) Appl. No.: 17/497,771

(22) Filed: Oct. 8, 2021

(65) Prior Publication Data

US 2022/0147773 A1 May 12, 2022

(30) Foreign Application Priority Data

Nov. 6, 2020 (KR) .................. 10-2020-0147645

(51) Int. Cl.
*G06K 9/00* (2022.01)
*G06F 18/21* (2023.01)
*G06T 7/194* (2017.01)
(Continued)

(52) U.S. Cl.
CPC ............ *G06F 18/217* (2023.01); *G06T 7/194* (2017.01); *G06V 20/52* (2022.01);
(Continued)

(58) Field of Classification Search
CPC .............. G06F 18/217; G06T 7/194; G06T 2207/10024; G06T 2207/20036;
(Continued)

(56) References Cited

U.S. PATENT DOCUMENTS 10,685,454 B2 6/2020 Kim et al.
10,692,002 B1 6/2020 Kim et al.
(Continued)

FOREIGN PATENT DOCUMENTS

CN 108334831 A * 7/2018
CN 108776808 A * 11/2018 ......... G01N 21/8851
(Continued)

*Primary Examiner* — Xin Jia (57) ABSTRACT

Provided is a method of creating a local database for local optimization of an object detector based on a deep neural network. The method includes performing preprocessing on an image extracted from real-time collected or pre-collected images from an edge device, modeling a static background image based on the image received through the pre-processing unit and calculating a difference image between a current input image and a background model to model a dynamic foreground image, detecting an object image from the image based on a training model, and creating a local database based on the background image, the foreground image synthesized with the background image, and the object image synthesized with the background image.

10 Claims, 8 Drawing Sheets

(51) Int. Cl.
*G06V 20/52* (2022.01)
(52) U.S. Cl.
CPC ............... *G06T 2207/10024* (2013.01); *G06T 2207/20036* (2013.01); *G06T 2207/20081* (2013.01); *G06T 2207/20084* (2013.01); *G06T 2207/30232* (2013.01)
(58) Field of Classification Search
CPC . G06T 2207/20081; G06T 2207/20084; G06T 2207/30232; G06T 2207/10016; G06T 7/11; G06T 7/254; G06T 3/4015; G06T 5/50; G06T 11/60; G06V 20/52; G06V 10/776; G06V 10/82; G06V 10/56; G06N 3/04; G06N 3/08
See application file for complete search history.

(56) References Cited

U.S. PATENT DOCUMENTS

| | | | |
|---|---|---|---|
| 2019/0362486 A1* | 11/2019 | Diao | G06T 7/0004 |
| 2020/0151963 A1 | 5/2020 | Lee et al. | |
| 2022/0148193 A1* | 5/2022 | Choi | G06T 7/73 |

FOREIGN PATENT DOCUMENTS

| KR | 10-2018-0135898 A | 12/2018 |
|---|---|---|
| KR | 102053906 B | 12/2019 |
| KR | 10-2020-0028330 A | 3/2020 |
| KR | 10-2020-0087310 A | 7/2020 |
| KR | 10-2020-0093426 A | 8/2020 |

\* cited by examiner

SYSTEM FOR LOCAL OPTIMIZATION OF OBJECT DETECTOR BASED ON DEEP NEURAL NETWORK AND METHOD OF CREATING LOCAL DATABASE THEREFOR

CROSS-REFERENCE TO RELATED APPLICATION

This application claims priority to and the benefit of Korean Patent Application No. 10-2020-0147645, filed on Nov. 6, 2020, the disclosure of which is incorporated herein by reference in its entirety.

BACKGROUND

1. Field of the Invention

The present invention relates to a system for local optimization of an object detector based on a deep neural network and a method of creating a local database therefor.

2. Discussion of Related Art

Recently, edge-computing technologies, which process a vast amount of data in real time through distributed small servers, that is, edge devices, not through a centralized server, are being actively researched and developed. As Internet of Things (IoT) devices spread in earnest, the amount of data has skyrocketed, and thus, cloud computing has reached its limit. To cope with the above problem, edge-computing technologies have been developed.

In the edge-computing technologies, since low-cost edge devices are mainly used and resources such as computational performance and memory are limited to minimize heat generation and power, a lightweight object detection algorithm is used for real-time processing.

The lightweight object detection algorithm does not provide a high level of accuracy in all environments, and therefore, re-learned data is collected in the installation environment of the edge devices to perform local optimization.

However, learning data needs to be reconstructed using the collected data according to the purpose of the algorithm and the local environment, which entails additional manpower and time costs.

RELATED ART DOCUMENT

Patent Document

Korean Patent Laid-Open Publication No. 10-2016-0071781 (Jun. 22, 2016)

SUMMARY OF THE INVENTION

The present invention is directed to a system for local optimization of an object detector based on a deep neural network that constructs data of a corresponding area from a fixed surveillance image using a pre-trained model and a background model and optimizes an edge terminal for the corresponding area through a re-learning and tuning process based on the constructed optimization database, and a method of creating local database therefor.

However, the problems to be solved by the present invention are not limited to the above problems, and other problems may exist.

According to an aspect of the present invention, there is provided a system for local optimization of an object detector based on a deep neural network, the system including: a server configured to create a trained training model based on a public database including data and a correct answer collected online and offline, download a local database and process the downloaded local database together with the public database to create an optimization database, and create an optimization model through a learning process based on the optimization database; and at least one edge device configured to extract an image from real-time collected or pre-collected images, receive the training model uploaded from the server, and extract an object image from the image based on the training model, input the extracted image into a background model to create a background image and a foreground image, create the local database based on the object image, the background image, and the foreground image and transmit the created local database to the server, and receive the optimization model from the server to create an object image detection result from the image.

According to another aspect of the present invention, there is provided a system for local optimization of an object detector based on a deep neural network, the system including: a server configured to receive an image extracted from real-time collected or pre-collected images, create a trained training model based on a public database including data and correct answers collected online and offline and extract an object image from the image based on the training model, input the image to a pre-stored background model to create a background image and a foreground image, create the local database based on the object image, the background image, and the foreground image, process the local database and the public database together to create an optimization database, and create an optimization model through a learning process based on the optimization database; and at least one edge device configured to collect the image and transmit the collected images to the server and receive the optimization model from the server to create an object image detection result from the image.

According to still another aspect of the present invention, there is provided a method of creating a local database for local optimization of an object detector based on a deep neural network, the method including: performing preprocessing on an image extracted from real-time collected or pre-collected images from an edge device; modeling a static background image based on the image received through the pre-processing unit and calculating a difference image between a current input image and a background model to model a dynamic foreground image; detecting an object image from the image based on a training model; and creating a local database based on the background image, the foreground image synthesized with the background image, and the object image synthesized with the background image.

According to another aspect of the present invention for solving the above-described problems, a computer program is combined with a computer, which is hardware, to execute the method of creating a local database for local optimization of an object detector based on a deep neural network and is stored in a computer-readable recording medium.

Other specific details of the present invention are included in the detailed description and drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Various advantages and features of the present invention and methods accomplishing them will become apparent from the following description of embodiments with reference to the accompanying drawings. However, the present invention is not limited to exemplary embodiments to be described below but may be implemented in various different forms, and these exemplary embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. Throughout this specification, the terms "comprise" and/or "comprising" will be understood to imply the inclusion of stated constituents but not the exclusion of any other constituents. Like reference numerals refer to like components throughout the specification and "and/or" includes each of the components described and includes all combinations thereof. Although "first," "second" and the like are used to describe various components, it goes without saying that these components are not limited by these terms. These terms are used only to distinguish one component from other components. Therefore, it goes without saying that the first component described below may be the second component within the technical scope of the present invention.

Unless defined otherwise, all terms (including technical and scientific terms) used in the present specification have the same meaning as meanings commonly understood by those skilled in the art to which the present invention pertains. In addition, terms defined in commonly used dictionaries are not to be ideally or excessively interpreted unless explicitly defined otherwise.

Hereinafter, a system 1 for local optimization of an object detector based on a deep neural network (hereinafter, system for local optimization of an object detector) according to an embodiment of the present invention will be described with reference to FIGS. 1 to 6.

Figure 1:
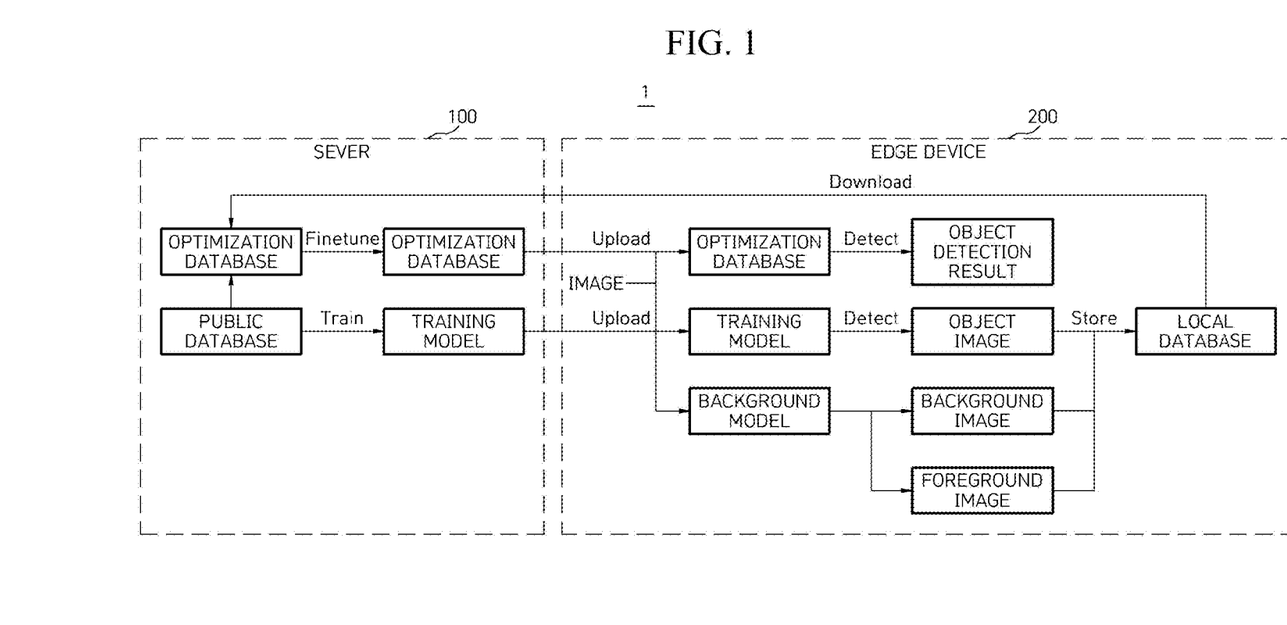
FIG. 1 is a block diagram of a system for local optimization of an object detector according to an embodiment of the present invention.

FIG. 1 is a block diagram of a system 1 for local optimization of an object detector according to an embodiment of the present invention.

The system 1 for local optimization of an object detector according to the embodiment of the present invention includes a server 100 and at least one edge device 200. In this case, FIG. 1 illustrates an example in an offline state in which an image collected by the edge device 200 may not be transmitted to the server 100.

The server 100 includes a public database and an optimization database as a database and includes a training model and an optimization model.

Specifically, the server 100 creates a trained training model based on an open public database including data and correct answers collected online and offline. The training model created in this way is uploaded to the edge device 200, and the edge device 200 detects an object based on the training model to create a local database.

In addition, the server 100 downloads the local database created from the edge device 200 and processes the downloaded local database together with the public database to create an optimization database, creates an optimization model through a re-learning and tuning process based on the optimization database and then provides the optimization model to the edge device 200.

The edge device 200 extracts an image from images collected in a real-time or pre-recorded form. In this case, the edge device 200 may collect a fixed surveillance image. The edge device 200 receives a training model learned from the initial server 100 by targeting the collected images and extracts an object image to be used for local optimization.

In addition, the edge device 200 creates a static background image by inputting the extracted image to a background model and creates a dynamic foreground image by calculating a difference image between the current input image and the background model.

Then, the edge device 200 synthesizes each of the foregrounds of the foreground image and the object image extracted from the training model with the background image based on reliability and creates a local database based on the background image, the foreground image synthesized with the background image, and the object image synthesized with the background image.

The server 100 downloads the local database created in this way and creates an optimization model as described above and uploads the created optimization model to the edge device 200, and the edge device 200 detects an object image result from the image according to the uploaded optimization model.

Figure 2:
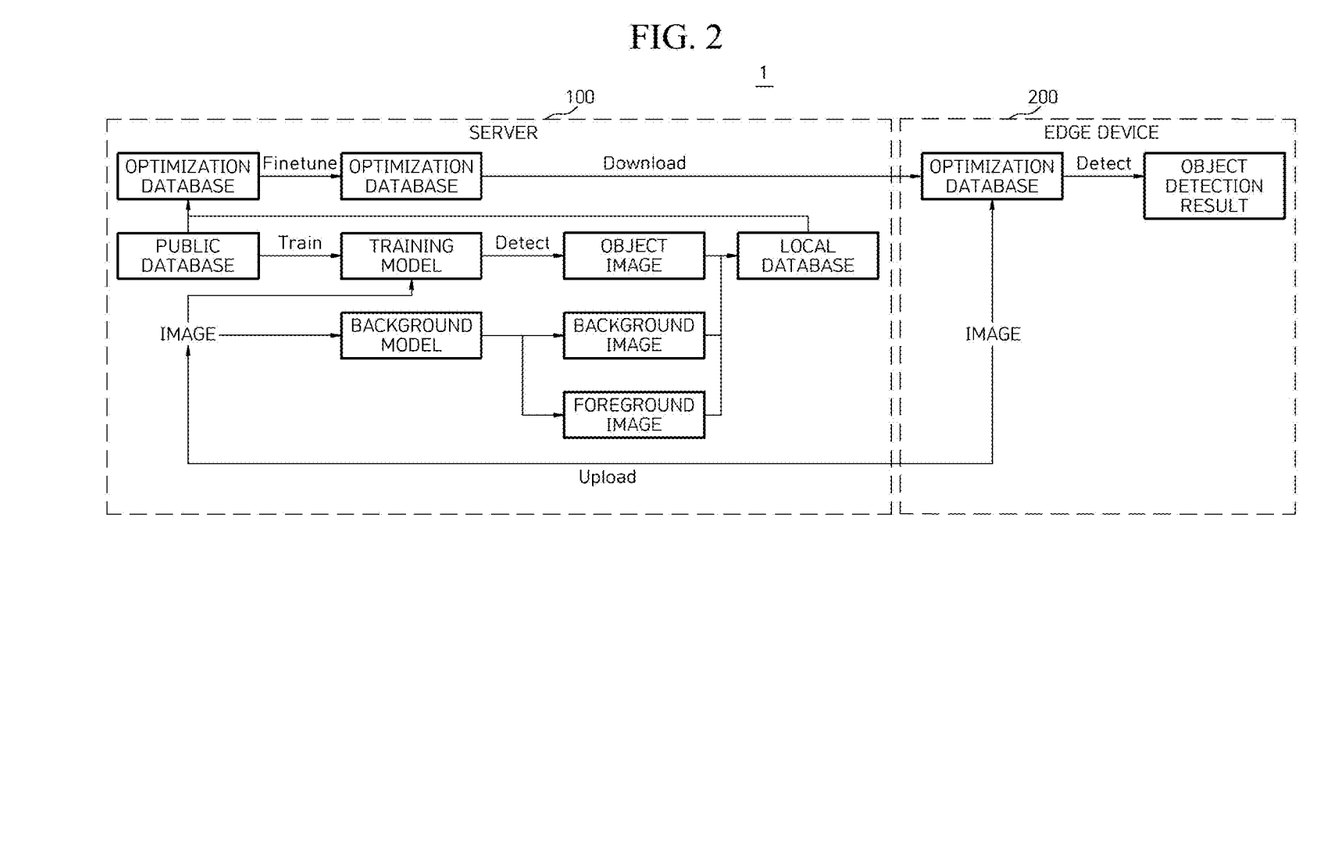
FIG. 2 is a block diagram of a system for local optimization of an object detector according to another embodiment of the present invention.

FIG. 2 is a block diagram of a system 1 for local optimization of an object detector according to another embodiment of the present invention.

The system 1 for local optimization of an object detector according to the embodiment of the present invention includes a server 100 and at least one edge device 200. In this case, unlike FIG. 1, the embodiment of FIG. 2 illustrates an example in an online state in which an image collected from the edge device 200 can be transmitted to the server 100.

First, the edge device 200 extracts an image from real-time collected or pre-collected fixed surveillance images and transmits the extracted image to the server 100.

The server 100 creates a trained training model based on a public database including data and correct answers collected online and offline and then extracts an object image from the image received from the edge device 200 based on the training model.

In addition, the server 100 inputs an image into a pre-stored background model to create a background image and a foreground image. In this case, the server 100 calculates a difference image between the current input image and the background model to create the foreground image. The server 100 creates a local database based on the background image, the foreground image synthesized with the background image, and the object image synthesized with the background image.

Then, the server 100 processes the local database and the public database together to generate an optimization database and creates an optimization model through a learning process based on the optimization database.

Thereafter, the edge device 200 downloads the optimization model from the server 100 and creates an object image detection result from the image.

In the system 1 for local optimization of an object detector according to the embodiment of the present invention described with reference to FIGS. 1 and 2, when the server 100 and the edge device 200 are in an offline state, the edge device 200 directly creates the local database and uploads the created local database to the server 100, and the optimized model in the server 100 is downloaded to the edge device 200 after a training process. On the other hand, when the server 100 and the edge device 200 are in an online state, the edge device 200 uploads an image to the server 100, performs the optimization in the server 100, and then transmits the optimized model to the edge device 200.

Hereinafter, a process of creating a local database for optimization commonly performed in FIGS. 1 and 2 will be described with reference to FIG. 3.

Figure 3:
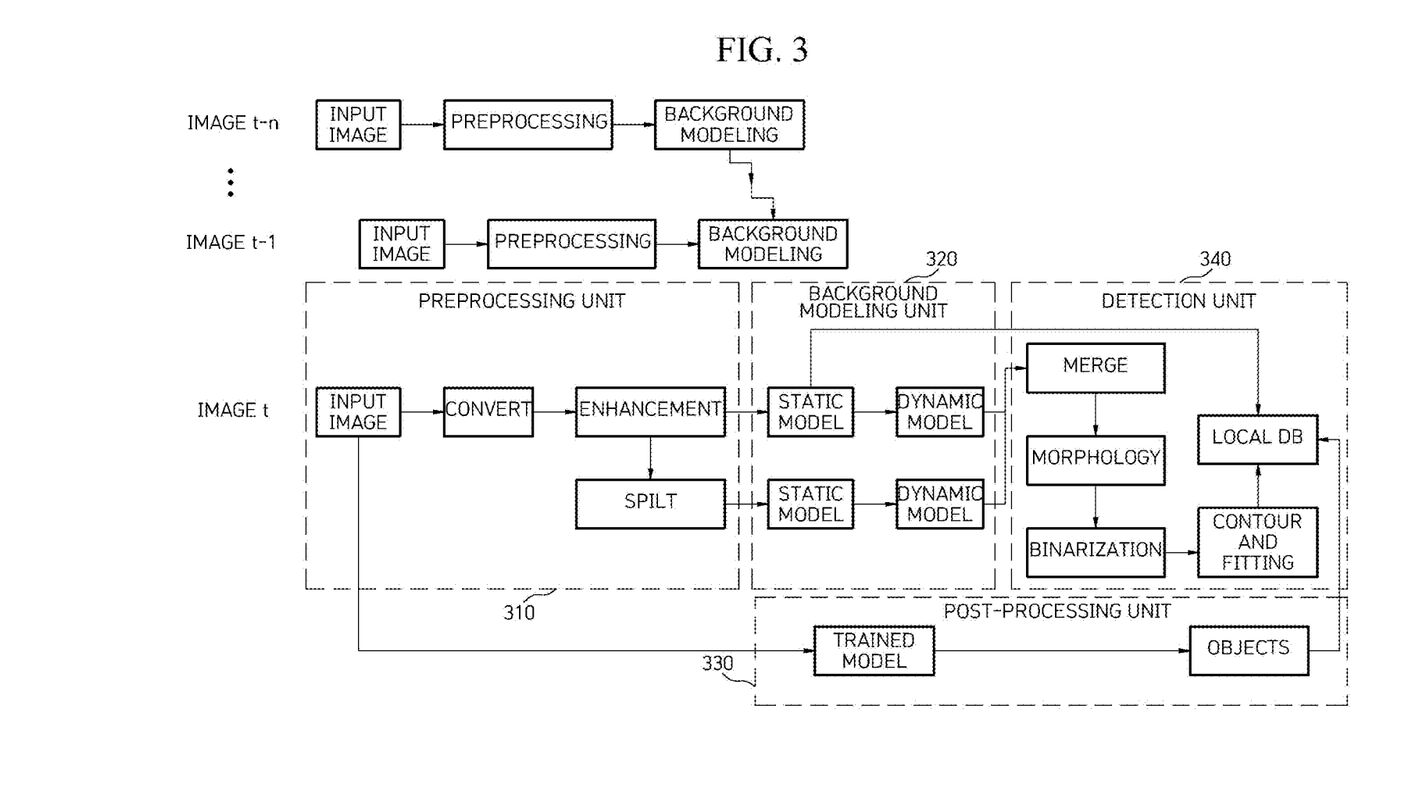
FIG. 3 is a diagram for describing a process of creating a local database.
Figure 4A:
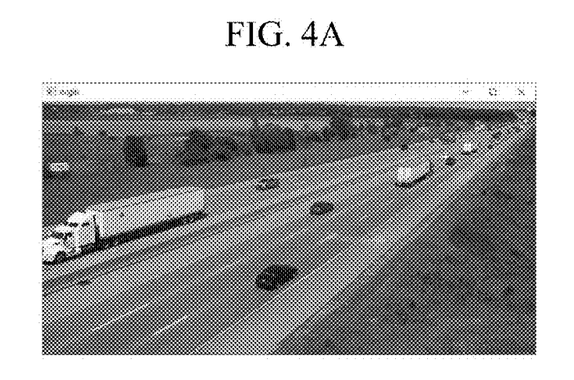
FIG. 4A to 4C are diagram for describing an image of a processing result by a preprocessing unit.
Figure 4B:
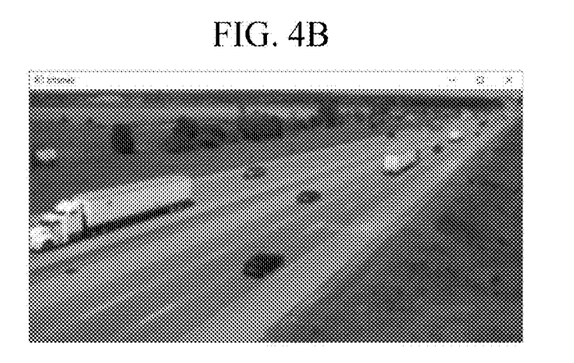
Figure 4C:
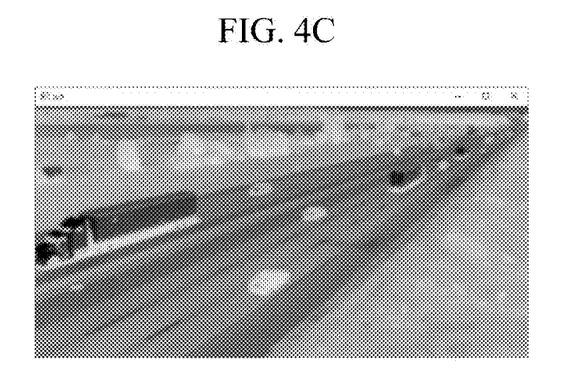

FIG. 3 is a diagram for describing a process of creating a local database. FIG. 4A to 4C are diagram for describing an image of a processing result by a pre-processing unit. FIG. 5A to 5D are view for describing an image of a processing result by a background modeling unit 320. FIG. 6A to 6D are diagram for describing an image of a processing result by a post-processing unit 340.

In this case, in the case of the embodiment of FIG. 1, the edge device 200 creates the local database, and in the case of the embodiment of FIG. 2, the server 100 creates the local database. Hereinafter, in the description of FIG. 3, the creation of the local database in the edge device 200 will be mainly described for convenience.

The edge device 200 includes a preprocessing unit 310, a background modeling unit 320, a detection unit 330, and a post-processing unit 340.

Specifically, the preprocessing unit 310 extracts an image from real-time images or stored images as illustrated in FIG. 4A and receives the extracted image. Then, an RGB color space of the image is converted into a predetermined type of color space to correspond to characteristics of the image. For example, the preprocessing unit 310 may convert the red/green/blue (RGB) color space into Gray, HSB, LAB, YCrCb, or the like according to the characteristics of the image.

In addition, the preprocessing unit 310 may create an enhanced image by applying a predetermined filter to the converted image. In this case, as the predetermined filter, various filters for edge enhancement, noise removal, and the like may be applied.

Then, the preprocessing unit 310 splits a channel to correspond to the color space of the converted image. In an embodiment, the preprocessing unit 310 splits or extracts a required channel from a multi-channel image. In particular, in the case of a single channel, the preprocessing unit 310 splits the single channel into the multi-channel by applying inversion or the like. For example, a hue/saturation/value (HSV) image may be split into each channel of color, saturation, and brightness, and in the case of black and white, bright objects and dark objects may be detected without omission through inversion.

Since a black (pixel value is 0) object is lost and is impossible to detect when calculating a difference image later, the bright objects may be enhanced with the preprocessed black and white image as illustrated in FIG. 4B, and the dark objects may be enhanced with preprocessed inverted images as illustrated in FIG. 4C.

The background modeling unit 320 models a static background image based on the image received through the preprocessing unit 310 and calculates a difference image between the current input image and the background model to model a dynamic foreground image.

Figure 5A:
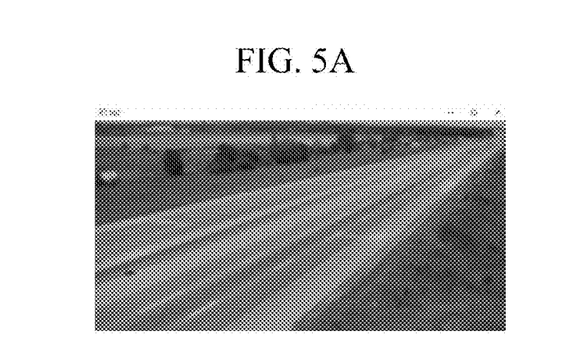
FIG. 5A to 5D are view for describing an image of a processing result by a background modeling unit.
Figure 5B:
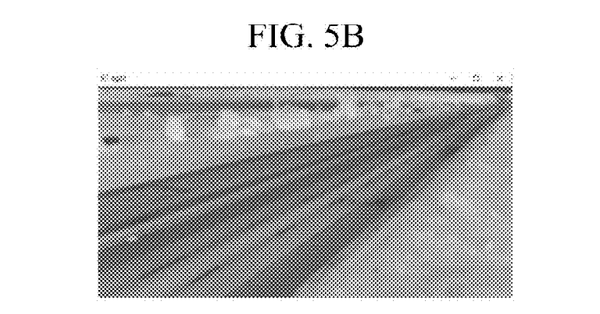

Specifically, the background modeling unit 320 may include a plurality of static models and dynamic models. The plurality of static models receive an enhanced image or a channel-split image from the preprocessing unit 310 and model the static background image based on n (n is a natural number greater than or equal to two) consecutive past images from a current image t as illustrated in FIGS. 5A and 5B. In this case, n is the number of past frames required for a static model, and n may be adjusted based on the amount of change in motion of a dynamic object.

Figure 5C:
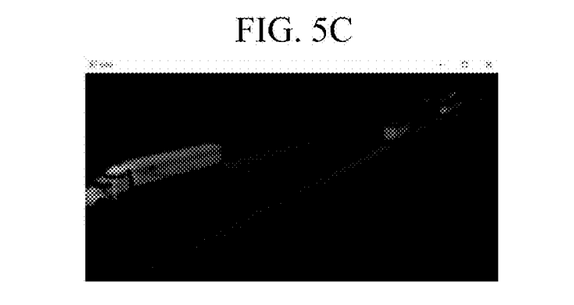
Figure 5D:
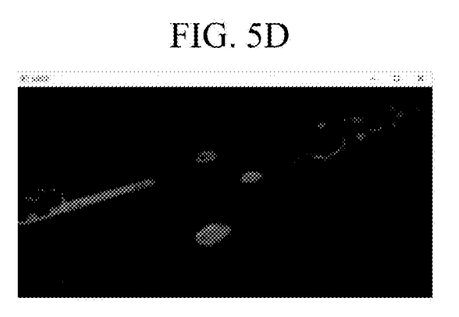

A plurality of dynamic models are extracted using the difference image between the current input image and the background model as illustrated in FIGS. 5C and 5D, and the dynamic model may compensate for the loss of the dark objects using multi-channel images created by the preprocessing unit 310.

Figure 6A:
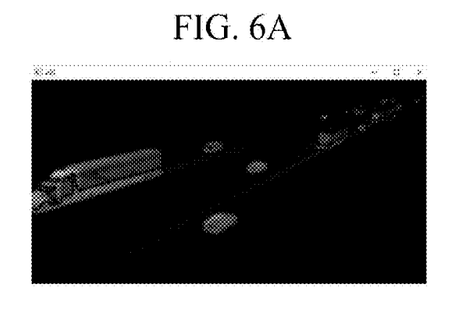
FIG. 6A to 6D are diagram for describing an image of a processing result by a post-processing unit.
Figure 6B:
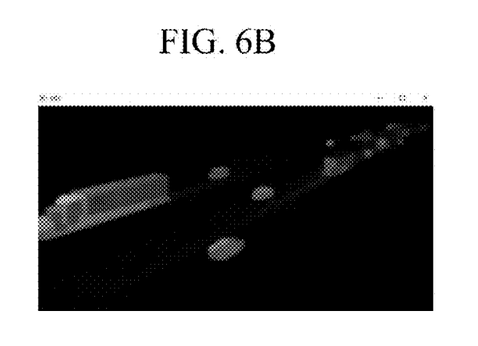
Figure 6C:
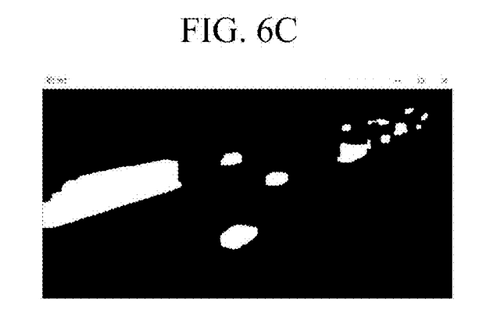
Figure 6D:
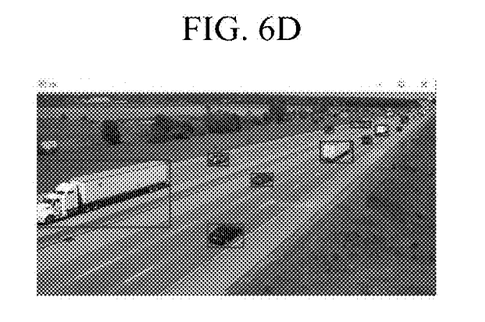

That is, FIG. 5 illustrates the static model after the pre-processing. When only the pre-processed black and white image according to FIG. 5A is used, it may be confirmed through FIG. 5C that all dark vehicles illustrated in FIG. 4B are lost. In order to compensate for this problem, on the contrary, as illustrated in FIG. 4C, the dark vehicle part may be brightened by using the inverted image to brighten the originally dark vehicle as illustrated in FIG. 5D. However, in this case, since the brightened vehicle part is lost, according to an embodiment of the present invention, it is possible to detect all objects without a lost part as illustrated in FIG. 6A by combining FIGS. 5C and 5D.

Next, the detection unit 330 detects an object image from the image based on the training model. The detection unit 330 detects an object image from an input image using a training model learned using the public database described in FIGS. 1 and 2.

The detection unit arranges detected object images based on detection reliability and then transmits the object image having detection reliability greater than or equal to a threshold value to the post-processing unit.

Next, the post-processing unit 340 merges the images received through the background modeling unit 320. In this case, the post-processing unit 340 may merge images in various ways, such as batch merging, channel weight merging, and dynamic model mask.

In addition, the post-processing unit 340 performs erosion and dilation operations, which are morphology operations, on the merged image. That is, the post-processing unit 340 may perform the morphology operation to remove noise generated from the difference image or merged image or to supplement lost pixels. In this case, the post-processing unit 340 may adjust the order of morphology operations and the number of morphology operations according to a ratio of noise and loss.

Next, the post-processing unit 340 performs a binarization process of classifying background and foreground on the result of performing the morphology operation, and may be binarized into a candidate group of objects of each pixel and other backgrounds and noises. In this case, various adaptive methods such as sampling, average, and median values of reference pixels may be used as a division value for performing the binarization process.

Thereafter, the post-processing unit 340 extracts (contours) contour information of the foreground object from a result of the binarization process and approximates the extracted contour information to create (fit) box information corresponding to the object image which is used to create the optimization database. Here, a distant object may be excluded from the optimization process because a large number of candidate groups may be combined, or an object that is too small may be removed as noise, making it difficult to smoothly fit.

As the above process is completed, as described above, the edge device 200 creates the local database based on the object image, the background image, and the foreground image and transmits the created local database to the server 100.

In this case, the background image and each synthesized image created according to each process in an embodiment of the present invention perform the following roles.

First, the background image is an image in which only a background without an object to be detected exists. Learning the background image may serve to remove false detection rather than correct answers. That is, the non-optimized detector erroneously recognizes an object to be detected, such as a traffic light or a building with a shadow background, and thus, the false detection occurs, which can be removed through the learning of the background image.

In addition, each synthesized image increases the learning data of the objects to be detected appearing in the corresponding area, thereby improving the reliability (0 to 100%) of the detected object and increasing the discrimination. In addition, when each synthesized image is used, there is an advantage in that non-detection can be reduced by additionally learning objects that were not detected by the existing detector as a foreground synthesized image. That is, since the object image and the synthesized image depend on a non-optimized detector and the foreground image and the synthesized image use the image processing of the background modeling, each synthesized image complements each other so as to reduce non-detected objects.

Hereinafter, a method of creating a local database for local optimization of an object detector based on a deep neural network (hereinafter, method of creating local database) according to an embodiment of the present invention will be described with reference to FIG. 7.

Figure 7:
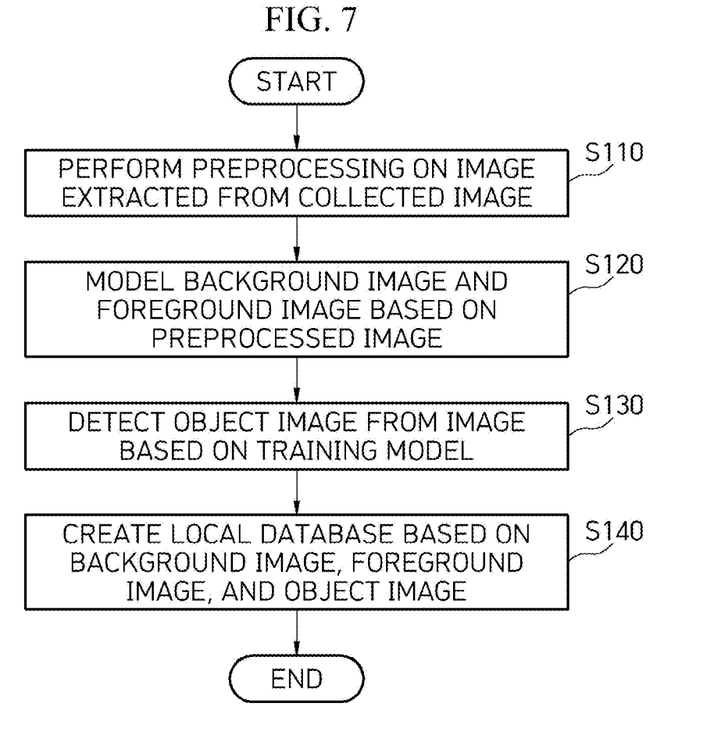
FIG. 7 is a flowchart of a method of creating a local database.

FIG. 7 is a flowchart of a method of creating local database.

Meanwhile, operations illustrated in FIG. 7 may be understood to be performed by the server 100 or the edge device 200, but the present invention is not limited thereto. Hereinafter, for convenience, the present invention will be described assuming that operations are performed by the server 100.

First, the server 100 performs pre-processing on an image extracted from real-time collected images or pre-collected images from the edge device 200 (S110).

Next, the server 100 models the static background image based on the preprocessed image and calculates the difference image between a current input image and the background model to model the dynamic foreground image (S120).

Next, the server 100 detects an object image from the image based on the training model (S130) and creates a local database based on the background image, the foreground image synthesized with the background image, and the object image synthesized with the background image (S140).

Meanwhile, in the above description, operations S401 to S407 may be further divided into additional operations or combined into fewer operations according to the implementation example of the present invention. In addition, some operations may be omitted if necessary, and the order between the operations may be changed. In addition, even when other content is omitted, the content of the system 1 for local optimization of an object detector of FIGS. 1 to 6 may also be applied to the content of FIG. 7.

The components of the present invention described above may be embodied as a program (or application) and stored in a medium for execution in combination with a computer which is hardware.

In order for the computer to read the program and execute the methods implemented as a program, the program may include code coded in a computer language such as C/C++, C#, JAVA, Python, machine language, and the like that the processor (central processing unit (CPU)) of the computer can read through a device interface of the computer. Such code may include functional code related to functions defining functions necessary for executing the methods, or the like, and include an execution procedure related control code necessary for the processor of the computer to execute the functions according to a predetermined procedure. In addition, such code may further include a memory reference related code for which location (address, house number) of the internal or external memory of the computer additional information or media necessary for the processor of the computer to execute the functions should be referenced. In addition, when the processor of the computer needs to communicate with any other computers, servers, or the like located remotely in order to execute the above functions, the code may further include a communication-related code for how to communicate with any other computers, servers, or the like located remotely using a communication module of the computer, how to transmit/receive any information or media during communication, or the like.

The storage medium is not a medium that stores data therein for a while, such as a register, a cache, a memory, or the like, but rather means a medium that semi-permanently stores data therein and is readable by a device. Specifically, examples of the storage medium include, but are not limited to, a read-only memory (ROM), a random-access memory (RAM), a compact disc (CD)-ROM, a magnetic tape, a floppy disk, an optical data storage device, and the like. That is, the program may be stored in various recording media on various servers accessible by the computer or in various recording media on the computer of the user. In addition, the medium may be distributed in a computer system connected through a network, and the medium may store computer-readable codes in a distributed manner.

The above description of the present invention is for illustrative purposes, and those skilled in the art to which the present invention pertains will understand that it is possible to be easily modified to other specific forms without changing the technical spirit or essential features of the present invention. Therefore, it should be understood that the above-described embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alternations derived from the claims and their equivalents are included in the scope of the present invention.

According to an embodiment of the present invention described above, it is possible to efficiently operate a lightweight algorithm that operates at high performance in real time through local optimization of an edge terminal.

In addition, since the local database used for optimization uses a pre-trained model, a background image, and a foreground image together, it is possible to implement local optimization only with the background image, prevent annotation omissions by increasing data based on a synthesis of foreground and object with background, and improve accuracy thereof.

The effects of the present invention are not limited to the above-described effects, and other effects that are not described may be obviously understood by those skilled in the art from the above detailed description.

What is claimed is:

1. A system for local optimization of an object detector based on a deep neural network, the system comprising:
   a server configured to create a trained training model based on a public database including data and a correct answer collected online and offline, download a local database and process the downloaded local database together with the public database to create an optimization database, and create an optimization model through a learning process based on the optimization database; and
   at least one edge device configured to extract an image from real-time collected or pre-collected images, receive the training model uploaded from the server, and extract an object image from the image based on the training model,
   input the extracted image into a background model to create a background image and a foreground image, create the local database based on the object image, the background image, and the foreground image, and transmit the created local database to the server, and
   receive the optimization model from the server to create an object image detection result from the image.

2. The system of claim 1, wherein the edge device calculates a difference image between the background model and a current input image to create the foreground image.

3. The system of claim 1, wherein the edge device creates the local database based on the background image, the foreground image synthesized with the background image, and the object image synthesized with the background image.

4. The system of claim 1, wherein the edge device collects a fixed surveillance image as the image.

5. The system of claim 1, wherein the edge device includes:
   a preprocessing unit configured to convert a red/green/blue (RGB) color space of the image into a predetermined type of color space to correspond to characteristics of the image, apply a predetermined filter to the converted image to create an enhanced image, and split a channel to correspond to a color space of the converted color space;
   a background modeling unit configured to model a static background image based on the image received through the preprocessing unit and calculate a difference image between a current input image and the background image to model a dynamic foreground image;
   a detection unit configured to detect an object image from the image based on the training model; and
   a post-processing unit configured to merge images received through the background modeling unit, perform erosion and dilation operations, which are morphology operations, on the merged image, perform a binarization process of splitting the background and the foreground based on a result of performing the morphology operations and then extract contour information of a foreground object based on a result of the binarization process, and approximate the extracted contour information to create box information corresponding to the object image which is used to create the optimization database.

6. The system of claim 5, wherein the background modeling unit receives the enhanced image or the channel-split image from the preprocessing unit and models the static background image based on n consecutive past images (n is a natural number greater than or equal to two) from a current image.

7. The system of claim 6, wherein the n past images are adjusted based on an amount of change in motion of a dynamic object.

8. The system of claim 5, wherein the detection unit arranges detected object images based on detection reliability and then transmits the object image having detection reliability greater than or equal to a threshold value to the post-processing unit.

9. The system of claim 5, wherein the post-processing unit adjusts an order of the morphology operations and the number of morphology operations based on a ratio of noise and loss of the merged image.

10. The system of claim 5, wherein the post-processing unit binarizes each pixel into a candidate group of an object and other background and noise based on a result of performing the morphology operation.

* * * * *